Aug. 18, 1936.  M. ROBESKE  2,051,746
SHOE TRIMMING MACHINE
Filed Jan. 21, 1935  2 Sheets-Sheet 1
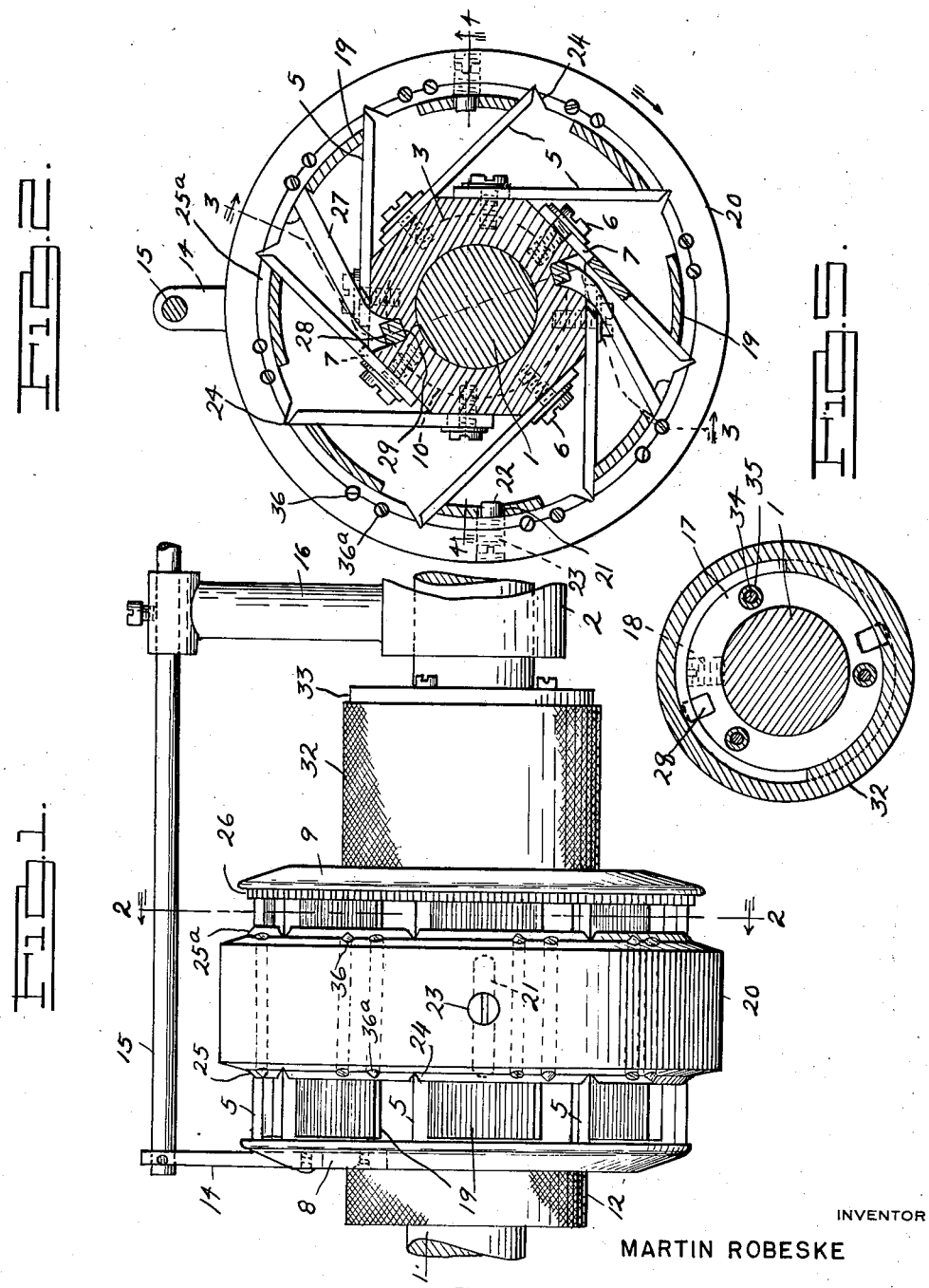
INVENTOR
MARTIN ROBESKE
BY
J.S. Murray
ATTORNEY Aug. 18, 1936.    M. ROBESKE    2,051,746
SHOE TRIMMING MACHINE
Filed Jan. 21, 1935    2 Sheets-Sheet 2
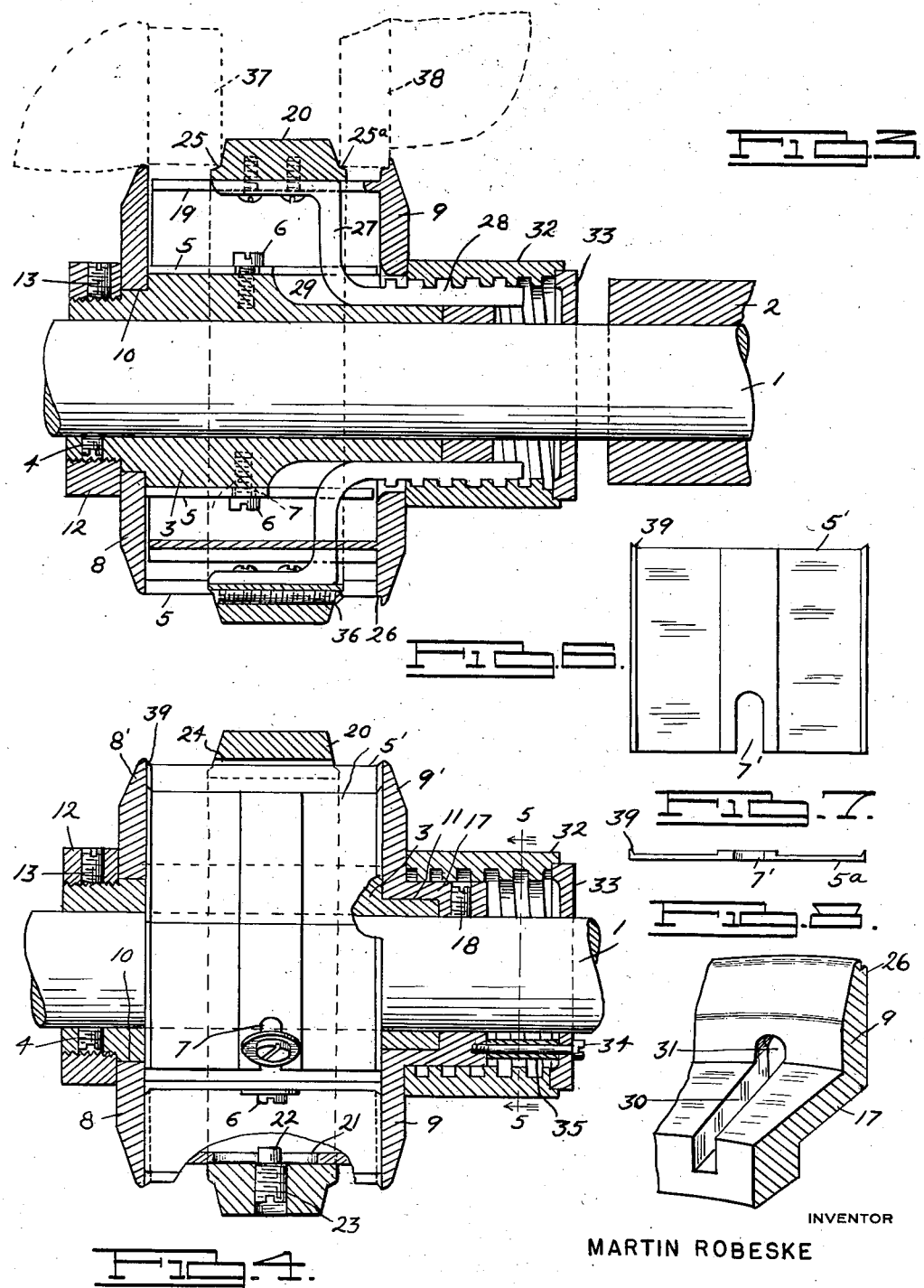
INVENTOR
MARTIN ROBESKE Patented Aug. 18, 1936

2,051,746

UNITED STATES PATENT OFFICE 2,051,746

SHOE TRIMMING MACHINE

Martin Robeske, Detroit, Mich.

Application January 21, 1935, Serial No. 2,641

21 Claims. (Cl. 12—92)

This invention relates to trimming machines, and particularly to machines for trimming the soles and heels of shoes.

An object of the invention is to equip a trimming machine with two guides, for jointly positioning the sole or heel of a shoe, or some other piece of work, for engagement by a rotary cutter, and to provide for relatively adjusting such guides to adapt them to soles, heels, or other work, of different thicknesses.

Another object is to extend the cutting edges of a trimming cutter between a pair of work guides, and to position a third work guide of annular form in surrounding relation to said cutting edges, and to adapt the annular guide for adjustment to and from the first mentioned guides so as to coact with either thereof in positioning work of various widths.

A further object is to provide a trimming machine with a rotative work guide having an annular work-engaging shoulder particularly adapted to engage the welt of a shoe, said shoulder being serrated to take a fine finishing cut on the welt.

A further object is to associate with the rotary cutter of a trimming machine a pair of work guides, one of which is adjustable to and from the other, and to effect adjustment of the last mentioned guide through rotation of a collar mounted coaxially and at one end of the cutter.

A further object is to associate with the cutter of a trimming machine a pair of work guides disposed at opposite ends of the cutting edges of the cutter, and to mount in a surrounding relation to the cutter a third guide adapted to coact with either of the first mentioned guides, and to provide means for holding one of the first mentioned guides from rotation.

Another object is to provide a pair of work guides coacting with the main cutter of a trimming machine, and to mount in one of such guides a circumferentially spaced series of auxiliary cutters adapted to chamfer an edge of a surface trimmed by the main cutter.

These and various other objects the invention attains by the construction hereinafter described, and illustrated in the accompanying drawings, wherein:

Fig. 1 is a view in side elevation of the improved machine, primarily showing the cutter and work guides thereof.

Fig. 2 is a cross sectional view of the same, taken upon the line 2—2 of Fig. 1.

Fig. 3 is an axial sectional view of the machine, taken upon the line 3—3 of Fig. 2.

Fig. 4 is another axial section, taken upon the line 4—4 of Fig. 2, but showing a slightly modified construction.

Fig. 5 is a cross sectional view through a rotative collar, serving to actuate the adjustable guide, the section being taken on the line 5—5 of Fig. 4.

Fig. 6 is a top plan view of a knife blade used with the machine shown in Fig. 4.

Fig. 7 is an end view of such blade.

Fig. 8 is a fragmentary perspective view of a work guide showing a slot formed therein to receive a rack bar.

In these views, the reference character 1 designates a shaft journaled in a bearing 2, upon which shaft a cutter body 3 is held fixed by a set screw 4. The body 3 has a central polygonal portion upon which are similarly secured a suitable number of cutting blades 5, each seating on one of the peripheral faces of said body. Said blades are equiangularly spaced, and project tangentially some distance outwardly from the cutter body, being each secured to the latter by a screw 6. The blades have slots 7 receiving such screws, and are consequently adjustable tangentially to compensate for wear.

The blades 5 fit snugly between a pair of annular work guides 8 and 9, mounted on annular shoulders 10 and 11 of the body 3, the guide 8 being retained on the shoulder 10 by a nut 12 threaded on an end of said body and locked in place by a set screw 13. The guide 8 is held from rotation with the body 3 by an arm 14 rigidly secured to said guide and projecting upwardly therefrom to rigidly engage a rod 15 mounted fast in a standard 16 rising integrally from the bearing 2. The work guide 9 is formed with a hub 17 projecting beyond the corresponding end of the body 3 and secured rigidly to the shaft 1 by a set screw 18.

Integrally carried by the work guide 9 near its outer periphery is a circular series of spaced arms 19, which project in parallelism with the cutter axis toward the guide 8, and terminate in close proximity to the latter. Said arms have smooth arcuate exterior faces which jointly provide a mounting for an annular work guide 20, which is slidingly adjustable on said arms to and from the guides 8 and 9. Said annular guide is constrained to rotate in unison with the guide 9 and arms 19 by slotting a diametrically opposed pair of said arms lengthwise as indicated at 21, and engaging in such slots a pair of splines 22 formed upon the inner ends of a pair of screws 23 set into the guide 20 at diametrically opposed points. The inner face of the guide 20 is formed with a plurality of V-shaped grooves 24 extending across said face to individually accommodate the edge portions of the blades 5. Upon the lateral faces of the guide 20 is formed a pair of similar annular work-engaging shoulders 25 and 25a, which are opposed respectively to the outer periphery of the work guide 8 and to an annular work-engaging shoulder 26 formed on the guide 9 and spaced a short distance outwardly from the arms 19. The grooves 24 have sufficient depth to cut through the shoulders 25 and 25a, thus permitting the blades 5 to take effect on the edge portions of the work which rest upon said shoulders. The shoulder 26 is formed with fine cutting serrations extending parallel to the cutter axis, as is indicated in Fig. 1.

For longitudinally adjusting the work guide 20, there is secured to its inner face a pair of diametrically opposed arms 27, which project inwardly from said guide and integrally carry a pair of rack bars 28 extending in parallelism with the shaft 1. The cutter body is formed with a pair of grooves or other suitable openings 29 elongated in the approximate direction of the shaft (see Figs. 2 and 3) to accommodate said rack bars, which also extend into grooves 30 formed in the hub 17, the work guide 9 being apertured as indicated at 31 to accommodate said rack bars. Rotatable on the hub 17 and projecting beyond the end thereof (see Fig. 4) is an adjusting collar 32, which is internally threaded to engage the teeth of said rack bars, as best appears in Fig. 3. Said collar is held in place between the guide 9 and a positioning ring 33 which is in turn held in place by a plurality of bolts 34 set into the hub 17 and extending through said collar, and carrying spacer sleeves 35 which are clamped between said ring and hub.

The work guide 20 carries two circular series of similar small cutters 36 and 36a, threaded into drilled openings which extend between the side faces of said guide, said openings interrupting the shoulders 25 and 25a so as to permit their cutting edges to extend across and adjacent to said shoulders, obliquely intersecting the rotary path of the cutting edges of the blades 5. The purpose of these small cutters is to apply a slight bevel to the marginal edge of the face trimmed by the blades 5. (See Figs. 2 and 3.) The cutters 36 and 36a are reversely arranged, so that their cutting edges are at opposite sides of the guide 20.

In use of the described machine, the operator first adjusts the guide 20 according to the width of the work. That is to say, the guide 20 is adjusted in a definite spaced relation to either of the guides 8 and 9, so that the work may, in one case rest on the periphery of the guide 8 and also on the shoulder 25 of the guide 20 or in the other case may engage the shoulders 25a and 26. Thus, in Fig. 3, the heel of a shoe is indicated at 37 to illustrate the first-mentioned case and the sole 38 is shown to exemplify the second case. The guide 9 is preferably used in trimming a sole, since the latter can be held very definitely in place between the guides 9 and 20 and against the shoulders 26 and 25a. Also, in case the shoe is of a welt type, the shoulder 26 will protect the welt from the main cutter, and when the sole has been trimmed to a flush relation with the welt, the serrations of the shoulder 26 will take a fine finishing cut on the welt.

In trimming any heels or the soles of weltless shoes, the guide 8 is preferably used conjointly with the guide 20, since the guide 8 has no work-engaging shoulder, and the blades 5 may act on the full work surface that is exposed between such guides. While Fig. 3 shows two pieces of work in position, this merely illustrates alternative positions, and it is not proposed to work on more than one piece at a time.

Whether the work be a sole or a heel, the bottom or tread face thereof is adjacent to the guide 20, and the small cutters 36 or 36a engage the edge formed by the intersection of such face with that trimmed by the blades 5, and finely chamfer such edge, as is well known to be necessary.

Rotation of the collar 32 serves to adjust the guide 20, such rotation being effective to shift the racks 28, arms 27 and guide 20 axially of the shaft 1.

The construction shown in Fig. 4 is modified from that already described by omitting the shoulder 26 so that the work in engaging either of the guides 8' or 9' rests on the periphery thereof. Such periphery in each case is of equal diameter to the shoulders 25' and 25a' so that the latter may properly coact with the guides 8' and 9' to support the work.

The blades 5', in this modification, each has a pair of short angular extensions 39 at the ends of their cutting edges, these extensions having cutting edges having approximately a forty-five degree inclination to the main edges of the blades, for the purpose of slightly beveling the edge formed by the intersection of the top and side face of a sole. This form of the machine is particularly suited to use in the manufacture of new shoes or in applying soles to weltless shoes, whereas the first-described construction is best suited to repair work.

The described trimming machine avoids necessity of stocking a considerable variety of cutters suited to different widths of work, and further serves to more definitely and accurately position work for trimming than is feasible with prior machines.

The invention is presented as including all such modifications and changes as come within the scope of the following claims.

What I claim is:

1. A trimming machine comprising a shaft, a rotary cutter fast on the shaft and having angularly spaced cutting edges, a work guide fixed on the shaft adjacent to corresponding ends of said edges, an annular companion work guide surrounding said cutting edges, and adjustable to and from the fixed guide to accommodate the two guides to various widths of work, an internally threaded collar rotative about the shaft relative to the cutter at one end of the cutter, and a plurality of racks slidable upon the cutter in substantial parallelism with the shaft, and threaded for engagement with and actuation by said collar, and an actuating connection from each rack to the adjustable guide.

2. A trimming machine comprising a shaft, a rotary cutter fast on the shaft and having angularly spaced cutting edges, a work guide fast on the shaft adjacent to corresponding ends of said edges, an annular companion work guide surrounding said cutting edges, and adjustable to and from the fixed guide to accommodate the two guides to various widths of work, an annular positioning member surrounding the shaft and spaced longitudinally thereof from the fixed guide, a collar rotatable about the shaft between said positioning member and the fixed guide, a plurality of spacer elements carried by the fixed guide and extending through said collar to engage said positioning annulus, and a connection from said collar to the adjustable guide for adjusting such guide responsive to rotation of said collar.

3. A trimming machine comprising a shaft, a cutter body fast on the shaft, a plurality of cutter blades fast upon said body and projecting therefrom in a tangential relation to said body, a work guide fast on the shaft at one end of the cutter body, an annular companion work guide substantially coaxial with the shaft and surrounding the cutter blades and adjustable to and from the fixed guide to accommodate the two guides to various widths of work, a plurality of spaced projections from the fixed guide jointly forming a mounting for the adjustable guide, and engaging the outer ends of the blades to reinforce the latter against cutting stresses, and means for holding the annular guide in its adjusted relation to the fixed guide.

4. A trimming machine comprising a shaft, a cutter body fast on the shaft, a plurality of cutter blades fast on said body and projecting tangentially therefrom, a work guide fixed on the shaft at one end of the cutter body, an annular companion work guide substantially coaxial with the shaft and surrounding the cutter blades, and adjustable to and from the fixed guide to accommodate the two guides to various widths of work, a plurality of projections from the fixed guide jointly forming a mounting for the adjustable guide and circumferentially spaced to accommodate the cutter blades, means carried by the adjustable guide engaging one of said projections to restrain the adjustable guide from rotation relative to the fixed guide, and means for holding the adjustable guide selectively adjusted.

5. A trimming machine comprising a shaft, a cutter fast on the shaft and having a plurality of angularly spaced cutting edges, a work guide fast on the shaft adjacent to corresponding ends of said edges, a second work guide adjacent to the other ends of said edges, a third work guide of annular form surrounding said cutting edges and adjustable to and from the first mentioned guides, and means for holding the third guide selectively adjusted.

6. In a trimming machine, the combination with a shaft, of a pair of work guides mounted on and spaced longitudinally of said shaft, a cutter fast on said shaft and formed between said guides with a plurality of angularly spaced cutting edges, a third work guide of annular form surrounding said cutting edges and adjustable longitudinally of the shaft with reference to the first mentioned guides, and means for holding the third guide selectively adjusted, the adjustable guide having lateral faces and one of the first mentioned guides having a face opposed to one of said lateral faces, and the lateral faces and said opposed face being each formed with an annular shoulder for positioning engagement with the work.

7. A trimming machine comprising a shaft, a pair of work guides spaced longitudinally of the shaft, one thereof being fixed on the shaft, means for restraining the other of said guides from rotation, a cutter fast on the shaft and formed with a plurality of angularly spaced cutting edges between said guides, a third guide of annular form surrounding the cutter between the first mentioned guides, and adjustable to and from the first mentioned guides, and means for holding the adjustable guide selectively adjusted.

8. A trimming machine comprising a shaft, a pair of work guides spaced longitudinally of the shaft, a cutter fast on the shaft and formed with a plurality of angularly spaced cutting edges between said guides, and a third work guide of annular form surrounding the cutter between the first mentioned guides and adjustable to and from the first mentioned guides, and two sets of auxiliary cutters carried by the adjustable guide projecting from the lateral faces thereof and coacting with the first mentioned cutter to chamfer an edge of the surface trimmed by the first mentioned cutter.

9. A trimming machine comprising a shaft, a cutter fixed on the shaft and having angularly spaced cutting edges, a work guide fixed on the shaft adjacent to corresponding ends of said edges, an annular companion work guide surrounding said edges, said guides having opposed faces formed with substantially annular work-engaging shoulders, one of the shoulders being formed with fine cutting teeth, and means for adjusting the companion guide to and from the fixed guide to accommodate work of various widths and for maintaining such adjustment.

10. A trimming machine comprising a shaft, a cutter fixed on the shaft and having angularly spaced cutting edges, a work guide fixed on the shaft adjacent to corresponding ends of said edges, an annular companion work guide surrounding said edges, a mounting for the companion guide carried upon the fixed guide, and means for adjusting the companion guide to and from the fixed guide to accommodate work of various widths and for maintaining such adjustment.

11. A trimming machine comprising a shaft, a cutter fixed on the shaft and having angularly spaced cutting edges, a work guide fixed on the shaft adjacent to corresponding ends of said edges, an annular companion work guide surrounding said edges, means for adjusting the companion guide to and from the fixed guide to accommodate work of various widths, means for maintaining such adjustment, and a plurality of relatively small cutters carried by and circumferentially spaced upon the work guide and having their cutting edges in the circular path of the cutting edges of the first mentioned cutter and adapted to chamfer an edge of the surface trimmed by the first mentioned cutter.

12. A trimming machine comprising a rotary cutter, a work guide rotative with the cutter at one end thereof, an annular companion work guide surrounding the cutter and formed with a plurality of circumferentially spaced openings elongated in substantial parallelism with the cutter axis, a plurality of small cutters individually set into and similarly projecting from said openings to chamfer an edge of the surface trimmed by the first mentioned cutter, and means for adjusting the companion guide to and from the fixed guide to accommodate work of various widths and for maintaining such adjustment.

13. A trimming machine comprising a shaft, a cutter fixed on the shaft and formed with an opening elongated in the approximate direction of the shaft, and having angularly spaced cutting edges, a work guide fixed on the shaft adjacent to corresponding ends of said edges, an annular companion work guide surrounding said edges and adjustable to and from the fixed guide to accommodate the two guides to various widths of work, a member at one end of the cutter rotative about the shaft relative to the cutter, and a connection from said member to the adjustable guide for effecting its adjustment responsive to rotation of said member, such connection extending within said opening of the cutter.

14. A trimming machine comprising a shaft, a cutter fixed on the shaft and having angularly spaced cutting edges, a work guide fixed on the shaft adjacent to corresponding ends of said edges, an annular companion work guide surrounding said edges and having its inner face formed with grooves extending across the full width of said face to individually accommodate the cutting edge portions of the cutter, and means for adjusting the companion guide to and from the fixed guide to accommodate work of various widths and for maintaining such adjustment.

15. A trimming machine comprising a rotary cutter, a pair of work guides coacting with said cutter, one thereof having an annular form and surrounding the cutter, means for adjusting the annular guide toward the other guide to accommodate work of various widths, and a plurality of relatively small cutters circumferentially spaced upon one of said guides and formed with cutting edges obliquely positioned with respect to the axis of the first mentioned cutter for trimming an edge of the surface trimmed by the first mentioned cutter.

16. A trimming machine comprising a rotary cutter, a work guide adjustable along the cutter axis, a member rotatable about the cutter axis, a connection from said member to the guide for adjusting the guide responsive to rotation of said member, and a companion work guide fixed in relation to the cutter axis and positioned between said member and the adjustable guide.

17. A trimming machine comprising a rotary cutter, a work guide in fixed proximity to the cutter, a companion work guide adjustable along the cutter axis at one side of the first mentioned work guide, and an adjusting means for the adjustable guide including an actuating member rotatable about said axis at the other side of the first mentioned guide.

18. In a trimming machine, a surface-trimming rotary cutter, a work guide rotatable with said cutter, and a plurality of edge-trimming cutters mounted upon said work guide and spaced apart in a circumferential relation to the axis of the rotary cutter, and individually adjustable in approximate parallelism with said axis.

19. In a trimming machine, a surface-trimming rotary cutter, a pair of companion work guides coacting with each other and with said cutter, and a plurality of edge-trimming cutters supported upon one of said work guides and spaced apart circumferentially to the cutter axis, and individually adjustable in the supporting work guide to and from the companion work guide.

20. In a trimming machine, a rotary cutter, a work guide at one end of the cutter, means for restraining said guide from rotation, an annular work guide surrounding the cutter, means for adjusting the annular guide to and from the first mentioned guide, and means for connecting the cutter and annular guide to rotate in unison.

21. In a trimming machine, a rotary cutter, a pair of work guides mounted in fixed proximity to the ends of such cutter, a third work guide positioned between the first mentioned guides, and means for adjusting the third guide to and from the first mentioned guides and for holding it selectively adjusted.

MARTIN ROBESKE.